United States Patent [19]

Matsumoto et al.

[11] 4,081,254
[45] Mar. 28, 1978

[54] METHOD OF TEMPERING GLASS PRODUCT

[75] Inventors: Kuniharu Matsumoto; Norihiko Shinkai, both of Yokohama, Japan

[73] Assignee: Asahi Glass Company, Ltd., Tokyo, Japan

[21] Appl. No.: 791,791

[22] Filed: Apr. 28, 1977

[30] Foreign Application Priority Data

May 7, 1976 Japan .................................. 51-51329

[51] Int. Cl.$^2$ ............................................. C03B 27/00
[52] U.S. Cl. ............................................ 65/116; 65/104
[58] Field of Search .................... 65/116, 69, 104, 114

[56] References Cited

U.S. PATENT DOCUMENTS

| | | | |
|---|---|---|---|
| 2,695,475 | 11/1954 | Ellis | 65/116 |
| 3,765,859 | 10/1973 | Seymour | 65/116 |

Primary Examiner—Arthur D. Kellogg
Attorney, Agent, or Firm—Oblon, Fisher, Spivak, McClelland & Maier

[57] ABSTRACT

In a method of tempering glass product by a heat treatment of quenching the glass heated at higher than a strain point and lower than a softening point, by dipping it into a liquid coolant, the tempering operation is carried out under applying ultrasonic vibration to the liquid coolant or the glass product.

4 Claims, 1 Drawing Figure

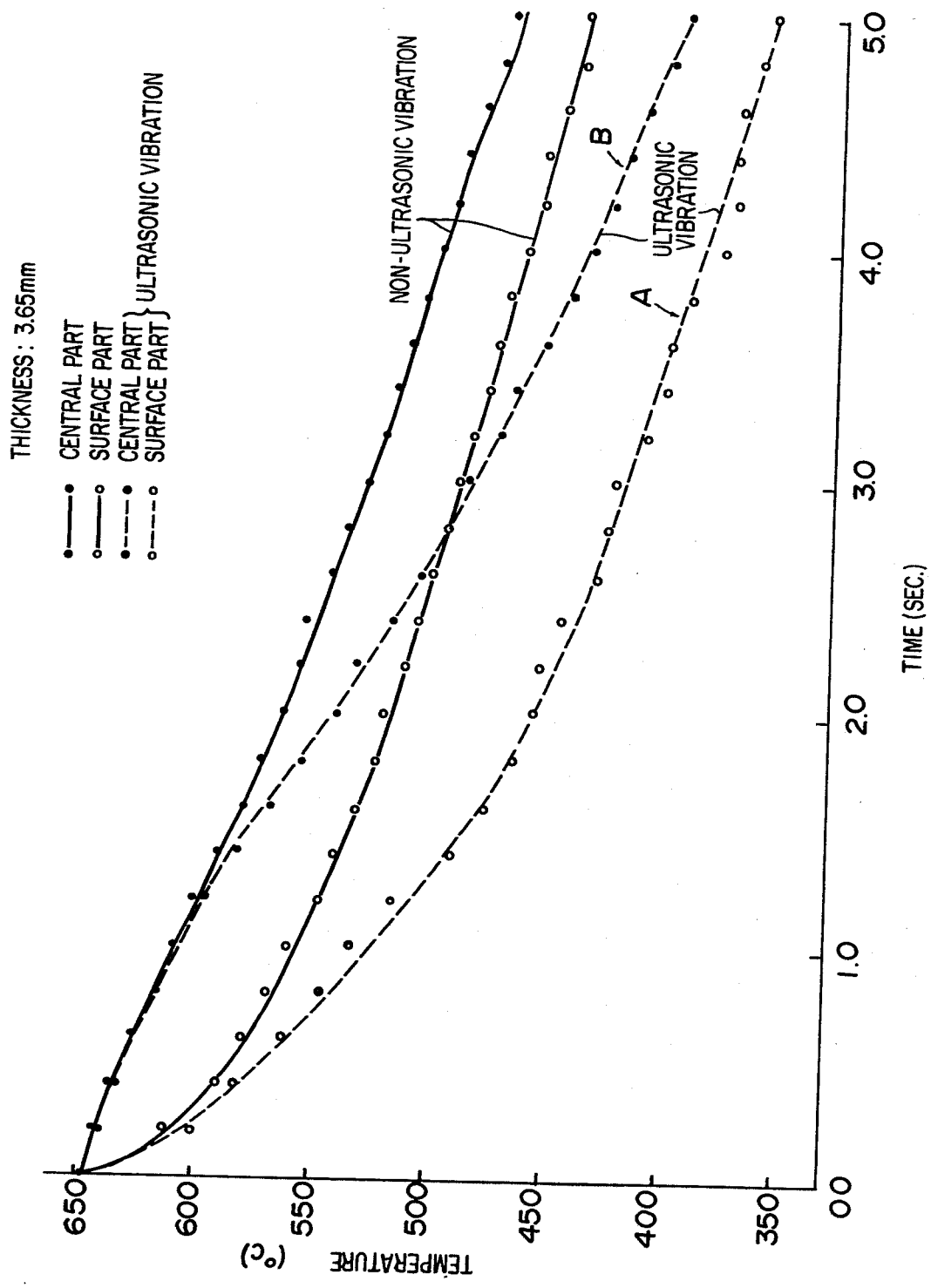

METHOD OF TEMPERING GLASS PRODUCT

BACKGROUND OF THE INVENTION

1. Field of the Invention

The present invention relates to a method of tempering glass product by a heat treatment. More particularly, it relates to a method of tempering glass by quenching the glass product heated at higher than a strain point and lower than a softening point by dipping it into a liquid coolant.

2. Disclosure of the Prior Art

It has been known to employ the method of tempering glass product by quenching the glass product heated at higher than a strain point and lower than a softening point by blowing a gaseous coolant such as air on the surface of the heated glass product to give high temperature difference between the surface and the central part of the glass product at the strain point whereby high compressive stress in the surface layer of the glass product could not give after quenching it to the room temperature.

However, the method is effective for a glass plate having a thickness of more than about 4 mm, and the method has been employed as the industrial method. However, when it is applied for a glass plate having a thickness of less than 3 mm, the quenching function for imparting enough temperature difference between the surface and the central part of the glass plate could not be given whereby high compressive stress could not be given in the surface layer of the glass plate.

It has been proposed as a method of tempering a glass plate having a thickness of less than 3 mm, to dip the glass plate heated at higher than a strain point and lower than a softening point into a liquid coolant in order to impart high temperature difference between the surface and the central part of the glass plate to give high compressive stress in the surface layer of the glass plate after quenching it to the room temperature. The method is referred as a tempering method by liquid quenching. The method has been disclosed in U.S. Pat. Nos. 3,640,694 and 3,679,388, etc.

Thus, in order to prevent the break of the glass by stress caused in the quenching in the tempering method by liquid quenching, it has been proposed to relieve the quenching function by forming a gas layer between the glass surface and the coolant as disclosed in U.S. Pat. No. 3,186,816 or to use a liquid coolant which has lower quenching function.

However, it has been difficult to obtain the glass product having satisfactory strength.

It has been porposed to stir a bath by a stirrer for imparting uniform temperature in the liquid coolant as disclosed in West German Pat. No. 640,176. It has been difficult to impart enough quenching in uniform by the method.

It has been also proposed to dip the glass plate heated at high temperature into a liquid coolant under ejecting the flow of coolant from an orifice in the liquid coolant to the glass plate as disclosed in Japanese Unexamined Patent Publication No. 99520/1974.

In the method, the glass plate suspended in the liquid coolant is rolled by the flow and it is formed certain deformation at the suspending part or it is fallen down. The operation has been not easy and it has been difficult to impart quenching in uniform and to give enough strength disadvantageously.

SUMMARY OF THE INVENTION

It is an object of the present invention to provide a method increasing strength of glass product by the above-mentioned tempering method by liquid quenching.

The foregoing and other objects of the present invention have been attained by tempering the glass product by quenching the glass product heated at higher than a strain point and lower than a softening point by dipping it into a liquid coolant under applying ultrasonic vibration to the liquid coolant.

BRIEF DESCRIPTION OF THE DRAWINGS

FIG. 1 is a diagram for curves for quenching the glass plate with or without the application of the ultrasonic vibration.

In FIG. 1, the dotted line A designates the curve for the temperature at the surface of the glass plate under the application of the ultrasonic vibration; and the dotted line B designates the curve for the temperature at the central part of the glass plate in the same condition. The full line C designates the curve for the temperature at the surface of the glass plate without the application of the ultrasonic vibration and the full line D designates the curve for the temperature at the central part of the glass plate in the same condition.

DETAILED DESCRIPTION OF THE PREFERRED EMBODIMENTS

The glass products treated by the method of the present invention includes glass plate, glass container, glass instruments for experiments, etc. The method of the present invention is especially suitable for tempering a glass plate having a thickness of less than 3 mm which has not been easily tempered by the air blowing method.

The liquid coolant can be silicon oils, oxyalkylene polymers, vegetable oils, mineral oils, molten metals, liquid paraffin, synthetic oils, etc. If necessary, the liquid coolant is warmed at suitable temperature.

In a quenching bath having a size enough to dip the glass, the liquid coolant is filled and suitable ultrasonic vibrating element is disposed at suitable positions in the liquid coolant whereby the ultrasonic vibration is applied to the liquid coolant in the tempering operation. The ultrasonic vibrating element can be also connected to the glass whereby the ultrasonic vibration is applied to the glass.

The frequency of the ultrasonic vibration applied is preferably higher than 16 KHz.

The glass is supported by a method of suspending by a suspender, a method of fitting in a frame or a method of disposing on a mold, and the glass is fed into a furnace to heat it at higher than a strain point and lower than a softening point such as 450° to 700° C.

The glass can be also heated to the temperature by carrying it by a roller into a furnace or by floating the glass plate on a gas house bed from which a hot gas is ejected.

The heated glass plate can be bent to desired shapes if necessary.

The glass plate heated at higher than the strain temperature is dipped into the liquid coolant in the vertical or transverse or other desired direction.

The dipping operation can be carried out by a method of suspending the heated glass or a method of holding the heated glass plate on a frame or a method of falling the heated glass.

The glass is dipped into the liquid coolant for suitable time and it is taken out from the liquid coolant after being quenched to lower than the strain point.

The method of taking out can be a method of pulling up with a suspender, a method of pulling up with a frame and other suitable methods.

It is preferable to apply the ultrasonic vibration from both sides of the glass.

One or more ultrasonic vibrating elements can be disposed on a side wall, an upper wall and/or a lower wall of the quenching vessel in suitable arrangement depending upon the size of the glass for treatment and the size of the quenching vessel.

In the tempering method by liquid quenching according to the present invention, the part which is firstly contacted with the liquid coolant is quenched in excess whereby the difference of temperature in plane direction between the firstly contacted part and the later contacted part on the glass plate is caused when the heated glass plate is dipped into the liquid coolant.

The thermal stress cause the tensile strain at the edge of the glass plate which is increased depending upon the increase of the size of the glass plate. Accordingly, when a large glass plate is tempered, a break of the glass plate is sometimes found in the quenching operation. Accordingly, it is sometimes preferable to temporarily delay the quenching of the firstly contacted edge of the glass plate by applying a controlling member for inhibiting the contact of the glass plate with the liquid coolant in the dipping operation. It is also preferable to cover the edge of the glass plate with a protective material having a small film coefficient of heat transfer. For example, the edge of the glass plate is covered with a heat resistant glass wool or ceramic wool or metallic wool or the edge of the glass plate is covered with a shield.

When the ultrasonic vibration is partially applied to the glass plate in the tempering method by liquid quenching, the part to which the ultrasonic vibration is highly applied, is tempered in higher degree whereby a partially tempered glass plate can be obtained.

In order to apply the ultrasonic vibration to the glass dipped in the liquid coolant in partially different intensity, for example, the ultrasonic vibration is applied to the glass surface by the ultrasonic vibrating element disposed at suitable positions in a quenching vessel to apply the ultrasonic vibration in perpendicular to the glass surface and the ultrasonic vibration is partially shielded by a masking plate of suitable shape of a ultrasonic absorbent or reflector disposed near the glass surface in the ultrasonic vibrating element side, whereby the ultrasonic vibration is prevent to be applied or is weakly applied to the masked glass surface.

As the other method, suitable shape of the ultrasonic vibrating element is arranged in the quenching vessel to apply the ultrasonic vibration to perpendicular to the glass surface, the ultrasonic vibration is applied to the glass surface in partially different intensity depending upon the shape of the ultrasonic vibrating element.

In the other method, two or more ultrasonic vibrating elements are arranged to apply the ultrasonic vibrations having different intensities to perpendicular to the glass surface.

In the other method, the standing wave is formed in the quenching vessel. For example, the ultrasonic vibration is applied by disposing the ultrasonic vibrating element at the bottom of the quenching vessel to the upper direction and the reflected wave reflected at the surface of the liquid coolant is mutually interfered with the applied ultrasonic vibration to form the standing wave whereby the intensity of the ultrasonic vibration is low at the nodes of the standing wave and it is high intensity at the other parts to form the laminar fields having different intensities of the ultrasonic vibration. When the glass product is perpendicularly inserted into the quenching vessel, the alternative bands of the high intensity parts and the low intensity parts of the ultrasonic vibration are given on the glass product.

When the glass product is inserted into the quenching vessel in the slant direction, the widthes of the bands are enlarged depending upon the slant angle.

The ultrasonic vibrating element is disposed on the side wall of the quenching vessel to apply the ultrasonic vibration to horizontal direction and the reflected ultrasonic vibration can be mutually interfered with the applied ultrasonic vibration to form the standing wave in the quenching vessel.

In the method, the high intensity layers and the low intensity layers of the ultrasonic vibration are alternatively formed in the perpendicular direction. Accordingly, when the glass plate is dipped in the horizontal direction, the same effect can be attained.

When a glass plate at slant angle is dipped into the liquid coolant forming the standing wave of the ultrasonic vibration, the ultrasonic vibration having different wide intensity bands can be applied to the glass plate.

When the ultrasonic vibration is formed to apply it to the glass surface in partially different intensities in the quenching vessel and the glass plate heated at higher than a strain point and lower than a softening point is dipped into the quenching vessel to quench it, higher compressive stress is applied to the parts of the glass surface applied with higher intensity of the ultrasonic vibration in comparison with the other parts of the glass surface whereby the glass plates having partially different tempered degree can be obtained.

The following function is considered in the method of the invention.

When the heated glass plate is dipped into a liquid coolant in the conventional method, the heated boundary is formed in the liquid contacted on the glass surface whereby the quenching efficiency is remarkably lowered. When the ultrasonic vibration is applied to the liquid coolant, the boundary layer of the liquid coolant is dispersed by the action of the ultrasonic vibration applied on the glass surface whereby the quenching efficiency to the glass is not lowered.

When the ultrasonic vibration is applied, small bubbles formed in negative pressure are contacted with the glass surface in micro, and are immediately broken to break the boundary layer whereby the boundary layer is not formed and the quenching effect is improved.

In accordance with the present invention, the compressive stress formed on the glass surface is remarkably higher than that of no application of the ultrasonic vibration.

The glass plate is not highly vibrated and the suspending part of the glass plate is not deformed and the suspended glass plate is not fallen down because the wave applied to the glass surface is the ultrasonic vibration. Accordingly, the dipping into the bath and the taking up from the bath are easy and the tempering operation by the liquid coolant can be remarkably improved.

The present invention will be further illustrated by certain examples.

EXAMPLE 1

A glass plate A for measuring the temperature at the central part in which a thermocouple having a form of foil is sealed at the center in the thickness direction of the glass plate (thickness: 3.6 mm; width: 20 mm; length: 70 mm) and a glass plate B for measuring the temperature at the surface layer in which a thermocouple having a form of foil is sealed at the distance of 0.55 mm from the surface (thickness: 3.6 mm; width: 20 mm; length: 70 mm) were prepared. The quenching conditions of the glass plate at the central part in the thickness direction and the glass plate at the distance of 0.55 mm from the surface were compared in the cases of the application of the ultrasonic vibration and non-application of the ultrasonic vibration.

In the quenching operation, a silicon oil having kinematic viscosity of 50 C.P. at the room temperature (TSF 451-50: manufactured by Toshiba Silicon K.K.) was charged in a 500 cc quenching vessel and the ultrasonic vibration having a resonance frequency of 50 KHz and an output of 50 W was applied to the liquid coolant. The glass plates heated at 670° C were respectively dipped and the time and the temperature of the central part of the glass plate and that of the surface part of the glass plate were recorded to obtain the quenching curves which are shown in FIG. 1.

As it is clear from FIG. 1, when the ultrasonic vibration was applied, the differences between the temperature at the central part and that of the surface part are remarkably high and the total quenching velocity was higher than that of non-application. Accordingly, in the tempering operation, it was found that the tempering stress in the case of the application of the ultrasonic vibration is larger than that of non-application.

EXAMPLE 2

In a quenching bath (500 cc) in which whole part of a glass plate can be dipped, the liquid coolant No. 1 shown in Table 1 was charged. A ultrasonic vibration (frequency: 50 KHz; output 50 W) was applied to the liquid coolant.

A glass plate made of soda lime glass (thickness: 1.8 mm; width: 20 mm; length: 70 mm) heated at 670° C was dipped into it to temper and the compressive stress in the surface part of the glass plate was measured.

The same heated glass plate was dipped into the same liquid coolant without an application of any ultrasonic vibration to quench it for tempering and the compressive stress was also measured.

As it is clear from the results in Table 1, the compressive stress in the surface part of the glass plate was remarkably higher when the quenching operation was carried out by using the liquid coolant under applying the ultrasonic vibration.

The experiment was repeated except using each liquid coolant shown in Table 1 as No. 2 to No. 7 and the compressive stress in the surface part of each glass plate was measured.

The results are shown in Table 1.

As it is clear from Table 1, the compressive stress was higher when the tempering operation was carried out by using the liquid coolant under applying the ultrasonic vibration.

Table 1

| Liquid coolant | Kinematic viscosity at room temp. (C.P.) | Compressive stress in surface part (kg/cm$^2$) A ultrasonic | B non-ultrasonic | Percent of increase of stress (%) |
| --- | --- | --- | --- | --- |
| Silicon oil | | | | |
| No. 1 TSF 451-10* | 10 | 1,560 | 1,400 | 11 |
| No. 2 TSF 451-50* | 50 | 1,140 | 640 | 78 |
| No. 3 TSF 451-100* | 100 | 1,120 | 580 | 93 |
| No. 4 TSF 451-1000* | 1,000 | 480 | 280 | 71 |
| No. 5 YF 33* | 100 | 1,140 | 640 | 78 |
| Lubricant oil | | | | |
| No. 6 Shell VALVATA OIL 85 | 1,040 | 940 | 880 | 7 |
| No. 7 liquid paraffin | — | 1,330 | 1,280 | 3 |

*Silicon oils manufactured by Toshiba Silicon K.K.
A liquid coolant under applying ultrasonic vibration
B liquid coolant under non-application.

EXAMPLE 3

In accordance with the process of Example 2, each glass plate was tempered by using the same liquid coolants, and each bending strength of the tempered glass plate was measured. The results are shown in Table 2.

As it is clear from the results of Table 2, the bending strengths of the tempered glass plates by using the liquid coolant under applying the ultrasonic vibration were remarkably higher than those of non-application.

In the measurement of the bending strength, in order to give the same condition, Vickers diamond was placed on the center of the tempered glass plate and 1000 g of load was applied to form the same crack and the break from the crack was measured.

Table 2

| Liquid coolant | Kinematic viscosity at room temp. (C.P.) | Bending strength (kg/cm$^2$) A ultrasonic | B non-ultrasonic | Percent of increase of strength (%) |
| --- | --- | --- | --- | --- |
| Silicon oil | | | | |
| No. 2 TSF 451-50* | 50 | 1,530 | 1,340 | 12 |
| No. 3 TSF 451-100* | 100 | 1,480 | 1,250 | 18 |
| No. 4 TSF 451-1000* | 1,000 | 1,130 | 930 | 22 |
| No. 5 YF 33* | 100 | 2,010 | 1,330 | 51 |
| Lubricant oil | | | | |

Table 2-continued

| Liquid coolant | Kinematic viscosity at room temp. (C.P.) | Bending strength (kg/cm²) A ultrasonic | Bending strength (kg/cm²) B non-ultrasonic | Percent of increase of strength (%) |
| --- | --- | --- | --- | --- |
| No. 6 Shell VALVATA OIL 85 | 1,040 | 1,610 | 1,170 | 38 |
| No. 7 liquid paraffin | — | 1,980 | 1,820 | 9 |

*Silicon oils manufactured by Toshiba Silicon K.K.
A liquid coolant under applying ultrasonic vibration
B liquid coolant under non-application.

EXAMPLE 4

In a quenching vessel (80 mm × 500 mm × 560 mm depth), the silicon oil (YF 30 manufactured by Toshiba Silicon K.K.) as the liquid coolant was charged. An ultrasonic vibrating element having a width of 150 mm was fixed on the side wall of the vessel (surface area of 500 mm) and the ultrasonic vibration having frequency of 29 KHz was applied in horizontal direction.

A float glass plate (width: 300 mm; length: 100 mm; thickness: 2.4 mm) heated at 680° C was dipped into the liquid coolant so as to apply the ultrasonic vibration in a width of 150 mm at the center of the glass surface in the quenching operation. (The ultrasonic vibration was not applied to both of edges) (width: 75 mm of the glass plate). The glass plate cooled to the room temperature was taken up and the compressive stresses in the surface parts and the broken piece density of the part to which the ultrasonic vibration was applied and the part to which the ultrasonic vibration was not applied, were measured.

As the result, the compressive stress and the broken piece density of the part to which the ultrasonic vibration was applied, were higher than those of non-application as shown in Table 3. It was found that the tempering degree of the glass plate was partially different.

Table 3

| | Compressive stress in surface part (kg/cm²) | Broken piece density (pieces/25 cm²) |
| --- | --- | --- |
| part under applying ultrasonic vibration | 1,300 | 250 |
| part under non-application | 470 | 5 |

EXAMPLE 5

Each ultrasonic vibrating element having a width of 150 mm was fixed on the side wall of a quenching vessel at one element per 500 mm length, and the elements were arranged to prevent superposition of the ultrasonic vibration when the ultrasonic vibrations are applied to the horizontal direction.

The liquid coolant of Example 1 was charged in the quenching vessel the output of one of the ultrasonic vibrating element was lowered to 75% of that of the other ultrasonic vibrating element.

A float glass plate (width: 100 mm; length: 300 mm; thickness: 2.4 mm) heated at 680° C was dipped into it to quench the glass plate (the ultrasonic vibration having high intensity was applied to half of the glass plate in right side 100 mm × 150 mm and that of low intensity was applied to half in left side).

The glass plate was taken out after cooling to the room temperature and the compressive stress in the surface part of the glass and the broken piece density of the part to which the ultrasonic vibration having higher intensity was applied and the part to which the ultrasonic vibration having lower intensity was applied, were measured. The results are shown in Table 4. It was found that the compressive stress and the broken piece density of the part in higher intensity were more than those of lower intensity and the tempering degree of the glass plate was partially different.

Table 4

| Intensity of ultrasonic vibration | Compressive stress in surface layer (kg/cm²) | Broken pieces (pieces/25 cm²) |
| --- | --- | --- |
| 1 | 1,600 | 520 |
| 0.75 | 1,300 | 250 |

EXAMPLE 6

The liquid coolant and the quenching vessel of Example 4 were used. The ultrasonic vibrating element was fixed on the bottom of the quenching vessel, and the ultrasonic vibration was radiated to perpendicular direction to form the standing wave in the vessel. The float glass plate heated at 680° C was perpendicularly dipped into the liquid coolant to quench it. The glass plate was taken up after cooling to the room temperature, the compressive stress was measured. The higher compressive stress parts and the lower compressive stress parts were alternatively formed in band form.

EXAMPLE 7

The liquid coolant and the quenching vessel of Example 6 were used and the standing wave was formed by the method of Example 6. A float glass plate heated at 680° C was slanted to 45° from perpendicular direction and was dipped into it. The glass plate was cooled to the room temperature and the compressive stress in the surface layer was measured.

The higher compressive stress parts and the lower compressive stress parts were alternatively formed in band form. The width of each band was broader than that of Example 6.

What is claimed is:

1. In a method of tempering a glass product by a heat treatment of quenching a glass product heated at higher than a strain point and lower than a softening point by dipping it into a liquid coolant, an improvement which comprises applying ultrasonic vibration to said liquid coolant or said glass product in the quenching operation.

2. A method of tempering a glass product according to claim 1 wherein the frequency of the ultrasonic vibration is higher than 16 KHz.

3. A method of tempering a glass product according to claim 1 wherein a firstly contacted edge of said glass product is covered or masked with a protective material in dipping said glass product into said liquid coolant.

4. A method of tempering a glass product according to claim 1 wherein the ultrasonic vibration is applied to said glass product heated at higher than a strain point and lower than a softening point in partially different intensity to impart partially different tempering degree to said glass product.

* * * * *